United States Patent [19]
Edwards

[11] Patent Number: 5,984,173
[45] Date of Patent: *Nov. 16, 1999

[54] NEUTRAL POINT CONNECTED APPARATUS PROVIDING COMPENSATION TO AN AC POWER LINE

[75] Inventor: Charles Wood Edwards, Monroeville, Pa.

[73] Assignee: Siemens Power Transmission & Distribution, LLC, Wendell, N.C.

[*] Notice: This patent issued on a continued prosecution application filed under 37 CFR 1.53(d), and is subject to the twenty year patent term provisions of 35 U.S.C. 154(a)(2).

[21] Appl. No.: 09/017,034

[22] Filed: Feb. 2, 1998

[51] Int. Cl.$^6$ ................................ G05F 1/70; H02M 1/12
[52] U.S. Cl. ............................................. 232/207; 363/40
[58] Field of Search ........................... 323/207; 363/39, 363/40, 41, 43, 98, 132

[56] References Cited

U.S. PATENT DOCUMENTS

| | | | |
|---|---|---|---|
| 3,638,094 | 1/1972 | Ve Nard, II | 321/5 |
| 4,651,265 | 3/1987 | Stacey et al. | 363/35 |
| 4,674,024 | 6/1987 | Paice et al. | 363/71 |
| 4,870,557 | 9/1989 | Stacey | 363/43 |
| 4,954,726 | 9/1990 | Lipman et al. | 323/207 |
| 5,138,544 | 8/1992 | Jessee | 363/43 |
| 5,198,746 | 3/1993 | Gyugyi et al. | 323/207 |
| 5,329,222 | 7/1994 | Gyugyi et al. | 323/207 |
| 5,343,139 | 8/1994 | Gyugyi et al. | 323/207 |
| 5,347,166 | 9/1994 | Schauder | 307/113 |
| 5,469,044 | 11/1995 | Gyugyi et al. | 323/207 |
| 5,515,264 | 5/1996 | Stacey | 363/132 |
| 5,568,371 | 10/1996 | Pitel et al. | 363/39 |
| 5,751,138 | 5/1998 | Venkata et al. | 323/207 |

FOREIGN PATENT DOCUMENTS

WO 95/12963 5/1995 WIPO.

*Primary Examiner*—Adolf Denake Berhane
*Attorney, Agent, or Firm*—Eckert Seamans Cherin & Mellott, LLC

[57] ABSTRACT

Apparatus for injection voltage compensation in series into an electric power line includes an inverter or other controlled voltage source which wye connects the secondary windings of a three-phase transformer to the load end of the electric power line. The transformer, which could already be present for meeting load requirements, has its primary winding connected to the source end of the electric power line and sustains the saturation currents rather than the inverter in response to faults on the source side of the transformer. Preferably, a three-phase inverter with a common dc link is used. For active power line conditioner (APLC) action, a second, also preferably a three-phase, inverter is connected in parallel to the load end of the electric power line and to the common dc link. This parallel inverter provides harmonic and reactive power compensation and also supplies the real power requirements of the wye connection inverter.

19 Claims, 7 Drawing Sheets

5,984,173

NEUTRAL POINT CONNECTED APPARATUS PROVIDING COMPENSATION TO AN AC POWER LINE

BACKGROUND OF THE INVENTION

1. Field of the Invention

This invention relates to apparatus incorporating solid state inverters for providing compensation on a three-phase electric power line. More particularly, it relates to apparatus which injects a compensating voltage into the power line in series, such as for example, a dynamic voltage restorer or an active power line conditioner. An inverter forms a load side neutral for the secondary windings of a transformer having the primary connected to the source end of the line.

2. Background Information

There are various types of apparatus for providing compensation on electric power lines which incorporate power inverters. One such system is the Dynamic Voltage Restorer (DVR) an example of which is described in U.S. Pat. No. 5,329,222. The DVR injects a voltage in series with a utility source for the purpose of making up missing voltage that occurs when upstream faults cause short term voltage sags. The DVR described in the above mentioned patent uses three single-phase inverter modules with a common dc link which are connected to the utility line through injection transformers. The common dc link approach allows the use of one common source of energy to supply three separate injection systems, one for each phase, in a three-phase system. This common source of energy can be for instance, a capacitor bank or an interface to draw the required power from the line, even when the voltage is sagged. The injection transformers isolate the power electronics from the power line allowing the maximum injection capacity to be less than the source voltage. It has been shown that the vast majority of sags in utility systems are less than 50% of the phase-to-neutral voltage. The DVR can correct these sags with an inverter rating of less than the connected downstream load which is protected by the DVR.

In practice, the inverter modules of the DVR can be implemented as individual power devices, if the ratings are high enough; series strings of power devices as is the present practice and described in U.S. Pat. No. 5,347,166; or single-phase inverter modules as described in U.S. Pat. No. 4,674,024.

As previously stated, the topologies which have an injection transformer allow the use of a common dc link and energy storage interface since the injection transformer provides the required isolation. The injection transformer also allows a particular power rating to be adapted to many different application voltages with only a change in the transformer and some sensing devices. The major problem with the injection transformer approach is the requirement of a transient flux capability of twice the rated injection voltage of the system, if arbitrary waveforms are to be produced. This requirement makes the transformer larger and unusual, and thus more expensive. Other accuracy and bandwidth limitation problems are introduced by transformer leakage reactance. Unavoidable dc offsets in the inverter make it difficult to prevent saturation, even if the injection transformer has a large flux margin. When the injection transformer saturates, large currents can flow in the inverter if fast control action is not taken. This requires a fast current limit or a trip to occur.

A system without an injection transformer would avoid some of these problems, but prevents the use of a common dc link. Such a requirement for separate energy source/supply interfaces for the inverter for each phase increases the cost and complexity of the system. Some flexibility of manufacture is also lost since the inverter voltage rating must be changed for different system voltages. More devices must be seriesed in a string inverter or more single-phase modules must be connected in series for the modular approach as the voltage increases, assuming the same power devices are used. Differently rated power devices can also be substituted, but this requires more development and requires a more varied parts inventory with lower quantities of an individual power device type.

Another type of compensation equipment which uses series injection with transformer coupling is the active power line conditioner (APLC). The APLC includes a series inverter and a parallel inverter connected by a common dc link. The parallel inverter transfers real power to and from the series inverter and also supplies harmonic currents and the reactive component of the load current. The series path in the APLC suffers from the same limitations as the DVR due to the series injection transformer discussed above.

There is a need, therefore, for an improved apparatus for providing compensation in electric power lines.

More particularly, there is a need for improved apparatus for providing compensation in the form of a voltage injected in series with the power line.

There is an additional need for such apparatus which avoids the prior art problems associated with saturation of an injection transformer.

SUMMARY OF THE INVENTION

These needs and others are satisfied by the invention which is directed to apparatus for providing compensation on an electric power line which includes a three-phase transformer having the primary connected to a source end of the electric power line and having inverter means connecting the three secondary phase windings of the transformer to the load end of the electric power line in a wye. While with this arrangement the inverters must carry all of the current drawn by the load, if there is a transient condition which causes the transformer to saturate it will be the source which will have to provide the saturation current. Typically, the source will be able to meet this demand. This arrangement is particularly suitable for those applications where the load requirements necessitate that a transformer be provided. In such cases, no additional costs are incurred for providing the transformers.

One end of each of the secondary phase windings of the transformer is connected to a corresponding phase of the load end of the electric power line with the second ends of these secondary phase windings connected to the inverter means. In a preferred embodiment of the invention, the inverter means comprises a three-phase inverter with a common dc link and with the ac terminals connected to the second ends of a corresponding one of the secondary phase windings on the transformer. In an alternate embodiment, three single-phase inverters are used, each of which has its own dc energy device. One of the ac terminals of each of the single-phase inverters is connected to the second end of the corresponding secondary phase winding of the transformer. The other ac windings of all three single-phase inverters are connected together to provide the neutral point of the wye. Using three single-phase transformers as an alternative to the three-phase transformer is also possible.

For DVR applications, the single inverter means, either a three-phase inverter or three single-phase inverters, provides the required voltage summed with the secondary phase windings of the transformer. For APLC applications, second inverter means are provided. This second inverter means is connected in parallel with the load end of the electric power line. Where the second inverter means is a three-phase inverter, the ac terminals are connected to the corresponding phase of the load end of the transmission line and the common dc link is connected to the common dc link of the series inverter connected to the secondary phase windings.

Where the load end of the transmission line has a neutral conductor, it may be connected directly to the common ac terminals of the single-phase inverters. Where three-phase inverters with a common dc link are used, a neutral inverter pole is provided with the ac terminal connected to the neutral conductor and with the dc terminals connected to the common dc link.

Filtering may be provided in the form of LC filters in which the inductor is connected in series with the ac terminals connected either to the secondary phase windings of the transformer, or in the case of the shunt inverter means, in series with the ac terminals connected to the phases of the load end of the electric power line. These LC filters also include a capacitor connected in shunt between the secondary phase winding or the load end phases and the associated inductor, and at the other end to a common node.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
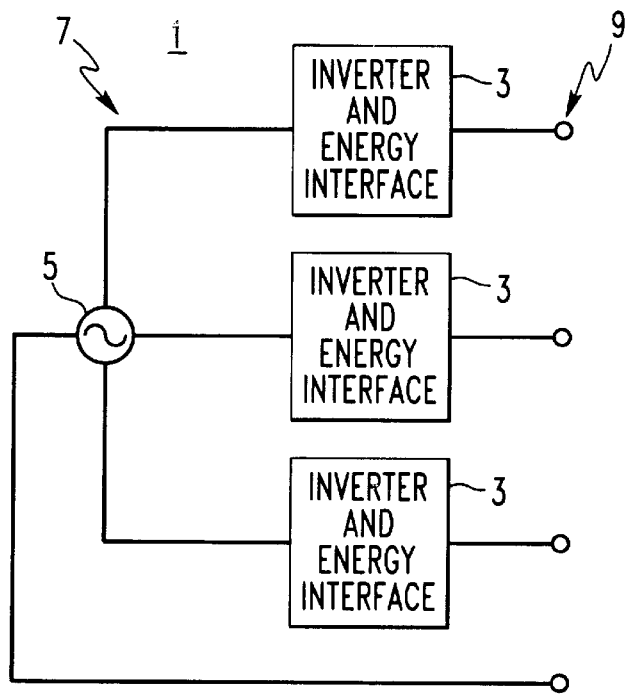
FIG. 1 is a simplified schematic circuit diagram of prior art DVR topologies.
Figure 2:
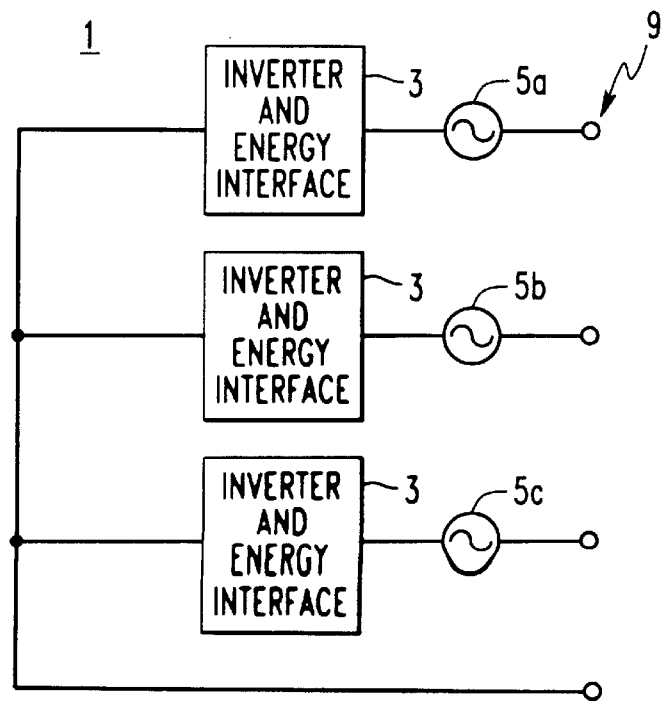
FIG. 2 is a simplified schematic circuit diagram of a DVR incorporating the invention.
Figure 4:
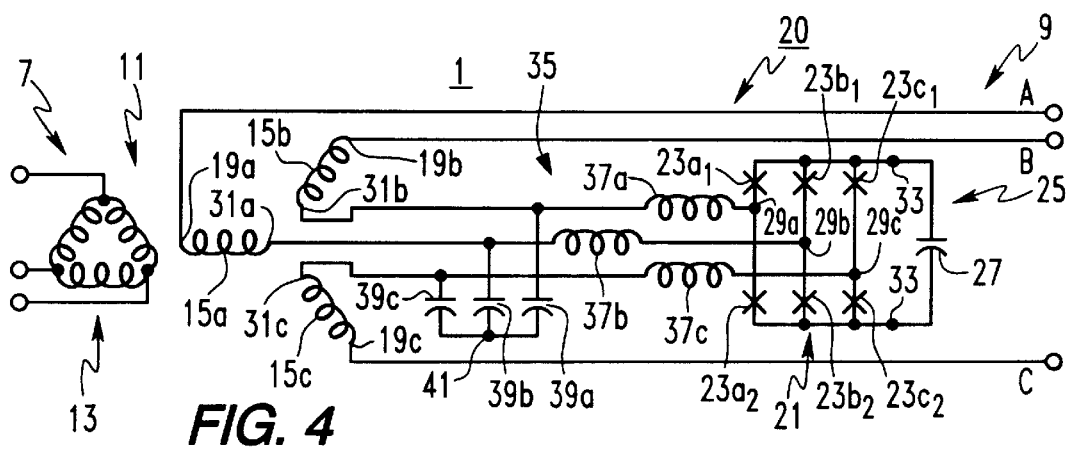
FIG. 4 is a schematic diagram of a neutral point connected DVR implemented with a three-phase inverter in accordance with one embodiment of the invention.

FIG. 1 illustrates schematically the prior art DVR arrangement in which voltage compensation on an electric power line 1 is provided by inverters and energy interfaces 3 connected in series between a source 5 at the source end 7 and the load end 9 of the power line. In this arrangement, as described above, the series injection transformers in the inverters and energy interfaces 3 can saturate, for instance in the presence of a fault on the source side of the electric power line 1. FIG. 2 illustrates the basic concept of the present invention in which the source is conceptualized as three individual single-phase isolated sources $5a$–$5c$ where the three inverter and energy interfaces are not between the source and the load but the result is functionally equivalent to the systems of FIG. 1. Changing the order of the voltage source and voltage compensation generator does not affect the end-to-end terminal characteristics or the sum of the two voltages. A practical way to achieve the circuit rearrangement of FIG. 2 is to use a three-phase transformer 11 having its primary windings $13a$–$13c$ connected to the source 5 and the secondary windings $15a$–$15c$ connected in a wye with a neutral point 17. Since one end of each inverter module 3 is now commoned at the neutral point 17, a further simplification of the circuit can be made. The three single-phase inverters made of series strings of power devices or individual single-phase modules as used in the prior art DVRs can be replaced by one three-phase inverter. If the neutral in point is not required, as in the case of a three wire system, the prior art arrangement of six inverter poles or module outputs which are used to double feed each injection transformer, or point of connection in the case of a transformerless DVR, are replaced with three inverter poles connected in a conventional three-phase inverter arrangement. Such an arrangement is shown in FIG. 4. In the particular embodiment shown, the primary windings 13 of the transformer 11 are delta connected. However, if the source end of the electric power line 1 included a neutral conductor (not shown), the primary windings could be wye connected.

The three secondary phase windings $15a$–$15c$ of the transformer 11 have one end $19a$–$19c$ connected to a corresponding phase of the load end of the electric power line. The second ends are connected by an inverter arrangement 20 which includes a single three-phase inverter 21. As is well known, the three-phase inverter 21 includes pairs of switching devices $23a_1$, $23a_2$–$23c_1$, $23c_2$ connected between the positive and negative rails of a common dc link 25. For power applications, the switches 23 can comprise devices such as IGBTs or GTOs. The dc link 25 incorporates a dc energy device 27 which in the form shown is a large capacitor. Alternatively, the dc energy device could be implemented by a smaller capacitor with an external large capacitor bank and an interface such as a chopper as is known (not shown). The ac terminals $29a$–$29c$ of the inverter 21 are connected to the second ends $31a$–$31c$ of the corresponding phases of the secondary phase windings $15a$–$15c$ of the transformer 11. The dc terminals 33 of the three-phase inverter 21 are connected to the dc link 25.

Filtering is provided by LC filters 35 connected between the ac terminals $29a$–$29c$ of the inverter 21 and the corresponding second ends $31a$–$31c$ of the transformer. Each of these ac filters includes a series inductor $37a$–$37c$ and shunt capacitors $39a$–$39c$ connected to a common node 41. The firing of the switches 23 in the inverter 21 is controlled to inject a voltage into the load end of the electric power line 1 summed with the secondary phase windings 15a–15c of the transformer 11 to make up for sags in the power line voltage which can be caused, for instance, by a fault on the source end of the power line.

There are several advantages of the system in accordance with the invention. The transformer 11 is excited by the voltage source 5. If the transformer 11 saturates, the high current transient is born by the source 5, not by the inverter 21. In general, the source 5 is much more tolerant of severe short-term overloads. In addition, many applications are single-customer specific and require a transformer in any event. Thus, the transformer 11 can serve the purpose of the voltage transformation and isolation which would be required in any event, and also provide a convenient connection point for the neutral point connected DVR, thus reducing the total cost of the system. Since the voltage component from the inverter 21 is not affected by injection transformer saturation limits, the arbitrariness of the waveform generated by the inverter is not limited by the transformer 11, including any limit on flux capability. In the embodiment shown in FIG. 4, the inverter 21 and its control is simplified since there are only three inverter poles to be controlled rather than the six individual inverter poles as in the prior art DVRs. Furthermore, one energy storage interface 27 can be used for all three phases. No unusual isolation is required. While this is the same as in the prior art DVR, but provides an advantage over other types of injection transformerless DVRs. Finally, the transformer 11 can be of conventional three-phase type, even if the DVR inverter must supply a zero sequence component to restore the voltage to its correct value since the inverter output does not pass through the transformer 11. In the prior art systems, single-phase transformers were used to avoid this problem.

Figure 5:
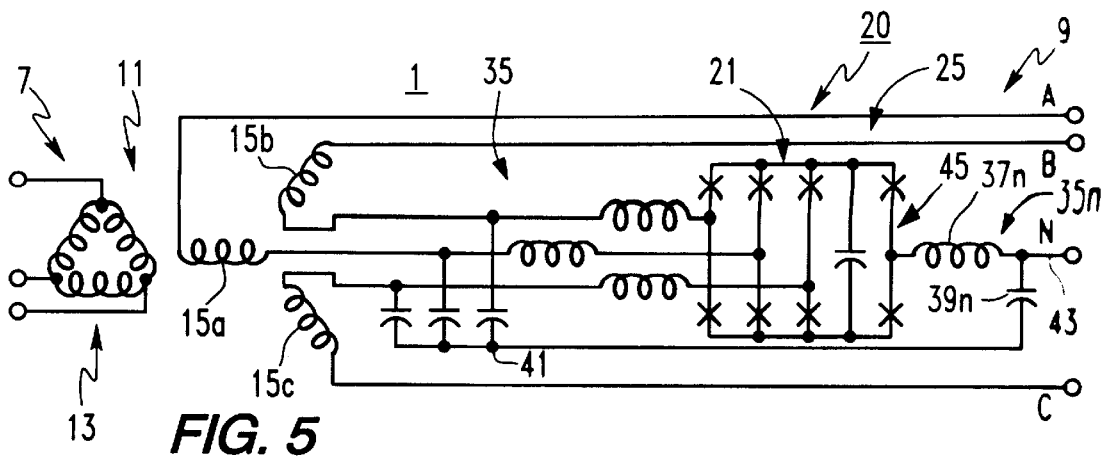
FIG. 5 is a schematic circuit diagram of a neutral point connected DVR implemented with a three-phase inverter and a neutral inverter for a four wire system in accordance with another embodiment of the invention.
Figure 6:
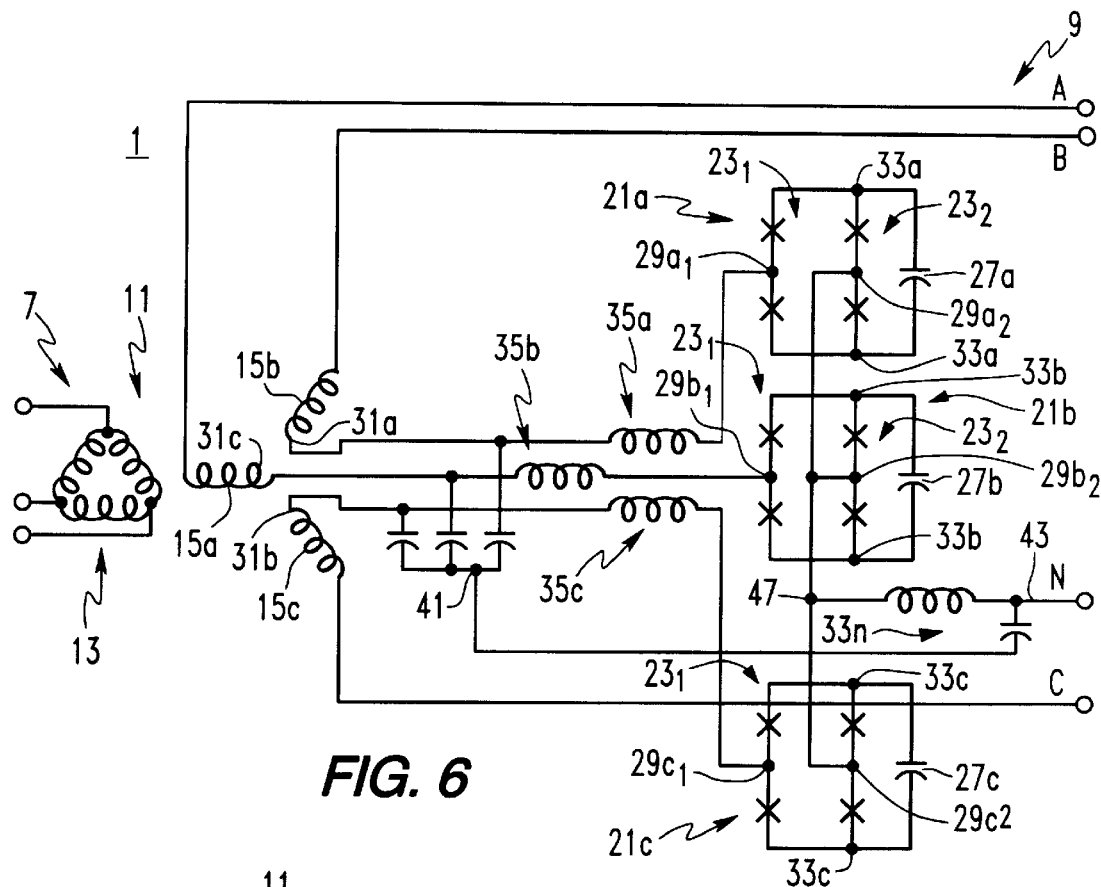
FIG. 6 is a schematic circuit diagram for a neutral point connected DVR implemented with single-phase inverters for a four wire system in accordance with still another embodiment of the invention.

FIG. 5 illustrates a neutral point connected DVR for four wire systems. Here, the load side 9 of the power line 1 includes a neutral conductor 43 and an additional neutral pole 45 is connected between the common dc link 25 in this neutral conductor 43. An additional LC filter 35n includes the inductor 37n and a capacitor 39n connected between the neutral conductor 43 and the common node 41. FIG. 6 illustrates a neutral point connected DVR which utilizes three single-phase inverters 21a–21c. Each of these single-phase inverters include two pairs of switches $23_1$, $23_2$, each with ac terminals $29a_1$–$29c_2$ at their mid-points. The first ac terminal $29a_1$–$29c_1$ of each of the single-phase inverters is connected to the LC filter 35a–35c to the second end 31a–31c of the corresponding phase of the secondary phase windings 15a–15c of the transformer 11. The second ac terminals $29a_2$–$29c_2$ are connected to a common neutral 47. For a four wire system, this common neutral 47 can be connected via filter 35n to the neutral conductor 43 of the second end of the electric power line 1. The dc terminals 33a–33c of each of the single-phase inverters 21a–21c are connected to an individual dc energy device 27a–27c.

Figure 7:
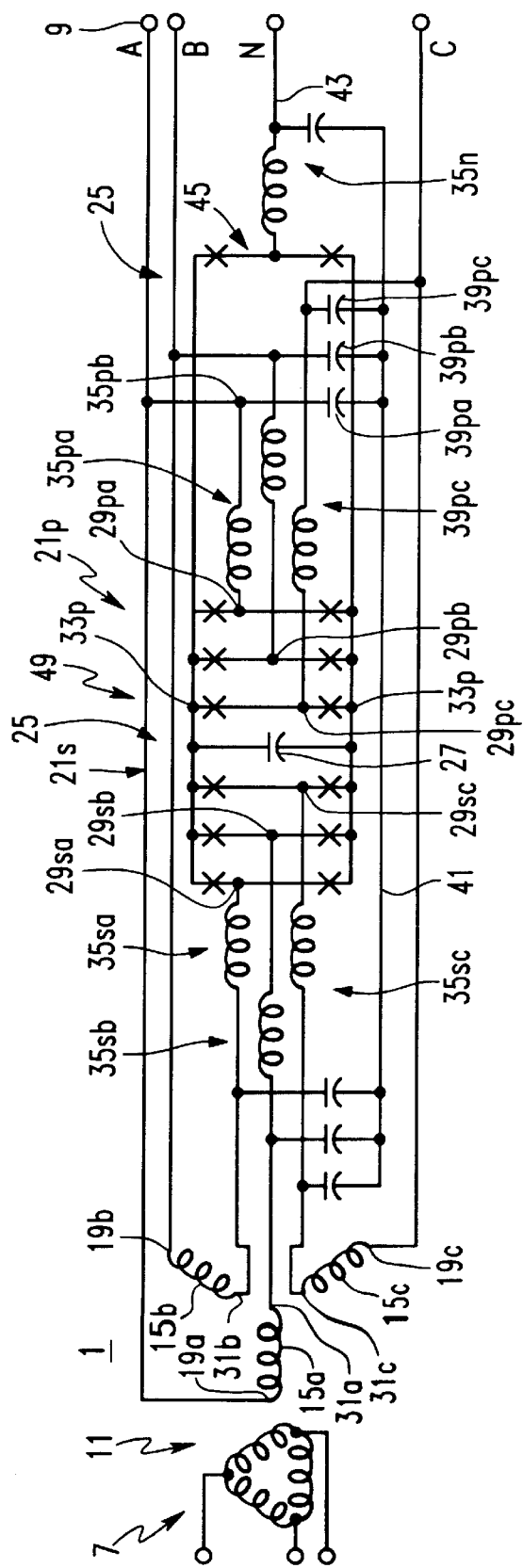
FIG. 7 is a schematic circuit diagram of an APLC implemented with two three-phase inverters and a neutral inverter for a four wire system in accordance an additional embodiment of the invention.

A neutral point connected APLC 49 in accordance with the invention is shown in FIG. 7 and includes a first three-phase inverter 21s connected through ac terminals 29sa–29sc to inject a voltage in series through the secondary phase windings 15a–15c of the transformer 11 as in the case of the DVR of the invention. It also includes a second parallel connected three-phase inverter 21p which shares the common dc link 25 with the inverter 21s through dc terminals 33p. The ac terminals 29pa–29pc of this parallel inverter are connected to the corresponding phases of the load end of the electric power line 1. Again, LC filters 35pa–35pc are provided. The capacitors 39pa–39pc of these filters are connected to the same common node 41 as the capacitors in the filters 35sa–35sc for the series inverter 21s. As the exemplary power line has a neutral conductor 43 on the load end, a neutral inverter pole 45 with its own LC filter 35n is provided in the manner previously discussed. The series inverter 21s of the APLC 49 functions just as it does in the neutral point connected DVR of FIG. 4. The parallel inverter 21p supplies harmonic currents, the reactive component of load current, and transfers real power to and from the series inverter 21s just as in prior art APLCs. The input transformer 11 is rated for the full VA capacity of the APLC, but is conventional, except for the neutral wiring. It does not have to be rated for two PU (per unit) flux to produce arbitrary waveforms. As an added benefit, the input and output are isolated from each other.

Figure 8:
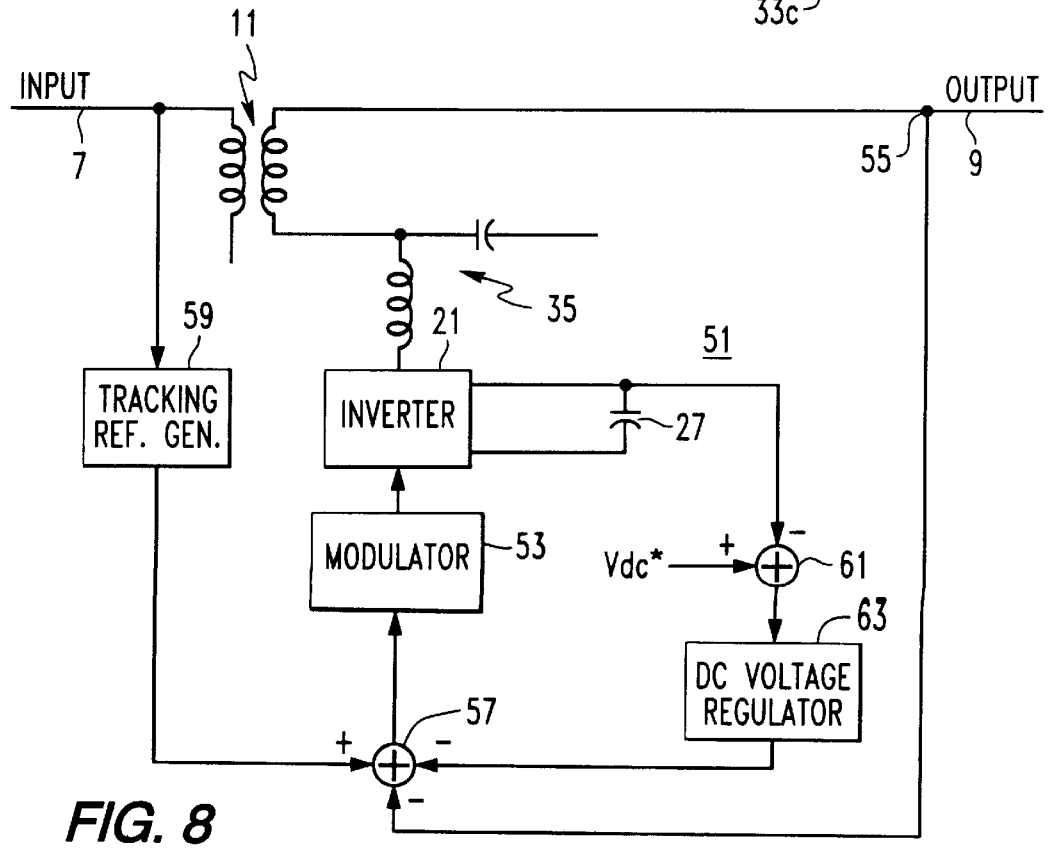
FIG. 8 is a schematic diagram of a basic control system for the neutral point DVR of FIGS. 4 and 5 with dc link energy storage.

FIG. 8 illustrates the basic control system 51 for the neutral point DVR with dc link energy storage as shown in FIG. 4. The inverter 21 is operated in a pulse width modulated mode by the modulator 53 which controls the firing of the switches 23 in the inverter. This firing pattern is determined as a function of the difference between the actual voltage at the output end of the electric power line as indicated at 55. This output voltage is compared with a reference voltage at the junction 57 with the difference being used by the modulator 53 to generate the firing signals to adjust the operation of the inverter so that the output voltage is corrected to the reference voltage. The reference voltage is generated by a tracking reference generator 59 which tracks the voltage on the source side of the transformer 11 and uses this as the reference voltage as long it stays within limits such as about 5–10% of the nominal line voltage. This is so that the voltage is allowed to vary within these limits. However, in the case of a large voltage transient such as a 50% sag in voltage, the tracking reference generator 59 utilizes a fixed reference value which forces the inverter to correct for the large transient. The modulator 53 also receives as an input any variations in the voltage across the energy storage capacitor 27 on the dc side of the inverter from a reference value Vdc* as determined that the summing junction 61. This variation voltage is controlled by a dc voltage regulator 63. This component is limited so as to minimize the effect on sag mitigation.

Figure 9:
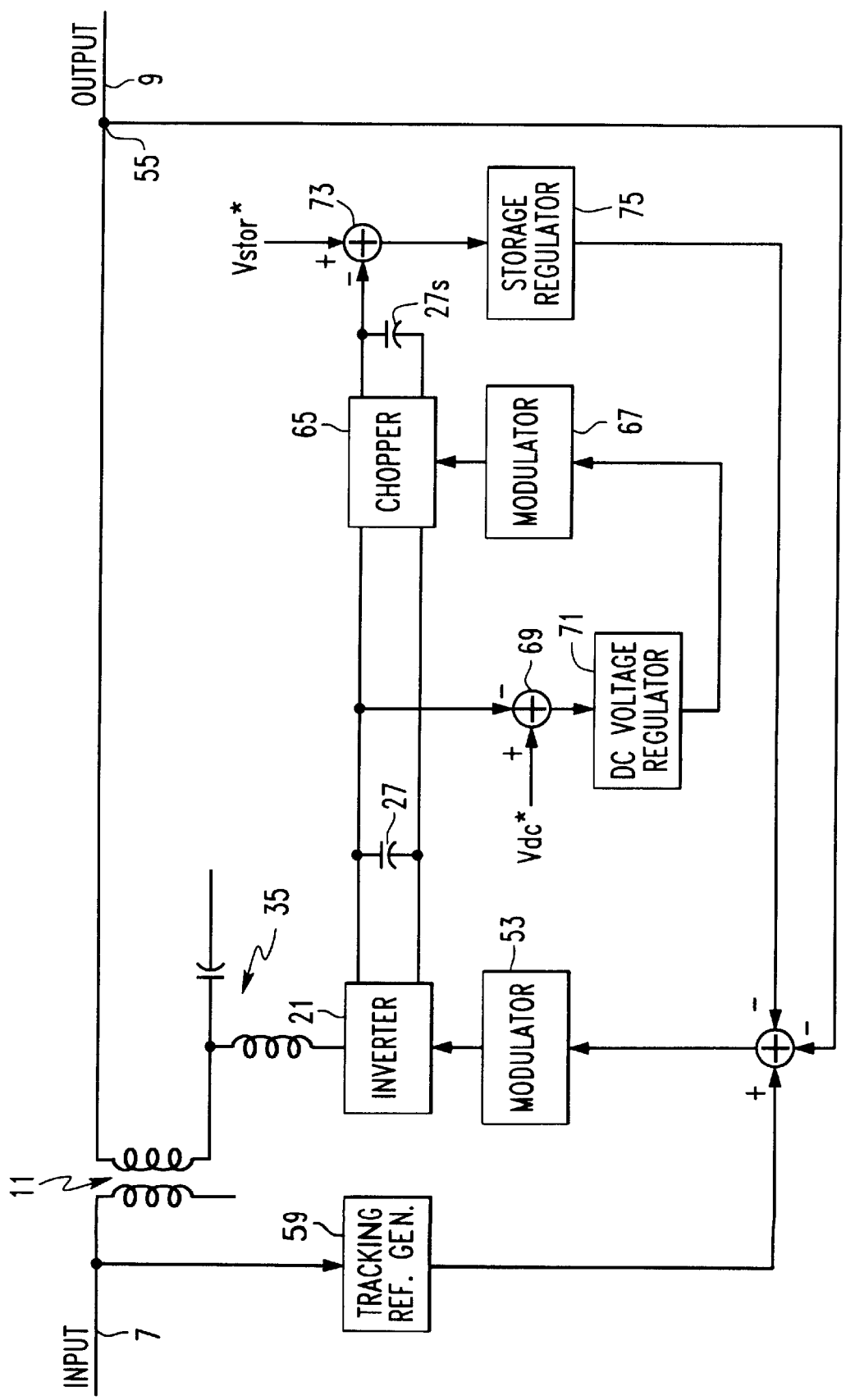
FIG. 9 is a basic control diagram for the neutral point DVR of FIGS. 4 and 5 with separate energy storage.

FIG. 9 illustrates the basic control for a neutral point DVR such as in FIG. 5 having separate energy storage wherein a second energy storage device 27s in the form of a large capacitor is used to supplement the energy storage device 27. A chopper 65 controls the flow of power between the capacitors 27 and 27s. The prior art chopper 65 is a dc converter having switches which are controlled by a modulator 67 and interface magnetics. The modulator controls the firing of the switches in the chopper to maintain the voltage across the capacitor 27 equal to the reference value Vdc* as determined at 69 and as controlled by the regulator 71. The output is limited to minimize the effect on sag mitigation. The voltage on the separate energy storage device 27s is controlled to a reference value Vstor* by applying the difference in this voltage as determined at the summing junction 73 and controlled by the regulator 75 as an input to the modulator 53 for controlling the inverter 21. This control loop is provided in addition to control of the compensation voltage injected by the inverter 21 into the power line in the manner described in connection with FIG. 8.

Figure 10:
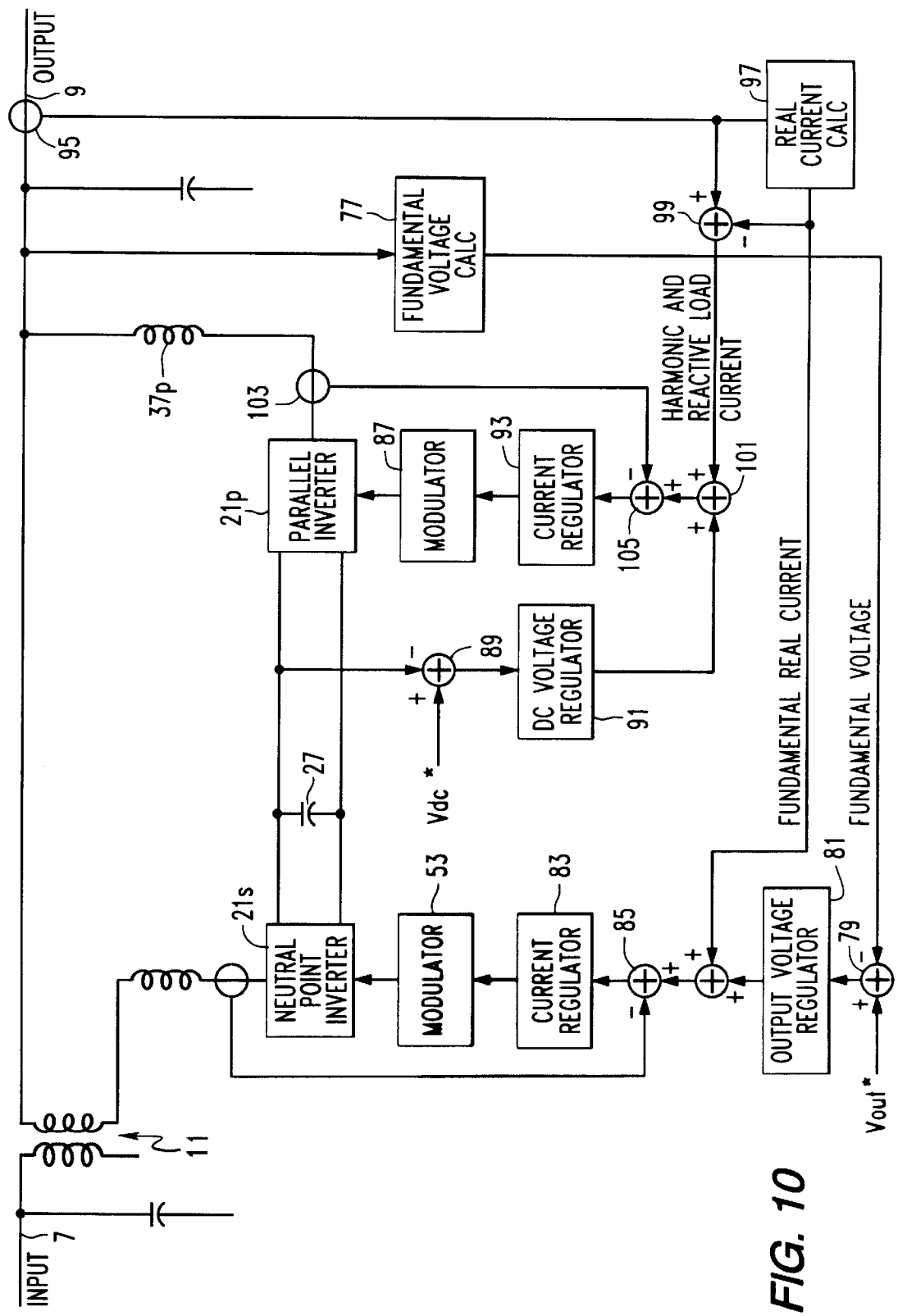
FIG. 10 is a schematic diagram of the basic control for a neutral point APLC regulator such as in FIG. 7.

FIG. 10 is a diagram of the control system for the APLC of FIG. 7. The fundamental component of the output voltage calculated at 77 is compared to a fixed reference value for the output voltage Vout* at 79. The variation of the fundamental voltage is corrected by a voltage regulator 81 and used by a current regulator 83 to control the modulator 53 which provides the firing signals for the series or neutral point inverter 21s. The actual current is fed back to a summing junction 85 ahead of the current regulator 83.

The parallel inverter 21p is controlled by the firing signal modulator 87 to provide the real power transferred to or from the power line to the capacitor 27 when series inverter 21s is performing its regulation function. This flow of real power is controlled by comparing the voltage across the capacitor 27 to the reference voltage Vdc* in the junction 89. The difference is amplified by a voltage regulator 91 is applied to a current regulator 93 providing the control signal for the modulator 87.

The parallel inverter 21p also provides the harmonic and reactive load current. The load current is measured by a current transformer (CT) 95. A real current calculator 97 determines the real component of the output current which is subtracted from the actual current at 99 to determine the harmonic and reactive current which is added to the current demand signal at 101 and compared with a feedback current signal generated by the CT 103 at the junction 105 for use by the current regulator 93 in controlling the firing signals generated by the modulator 87.

The invention eliminates some of the problems caused by the injection transformer in a prior art DVR or APLC. The inverter component of the voltage is not coupled through an injection transformer thereby eliminating concerns about its flux capability and saturation due to waveform complexity and inverter errors. The invention can be advantageously applied where a voltage transformer is required anyway to suit the load requirements thereby eliminating the cost of an extra transformer entirely.

Figure 11:
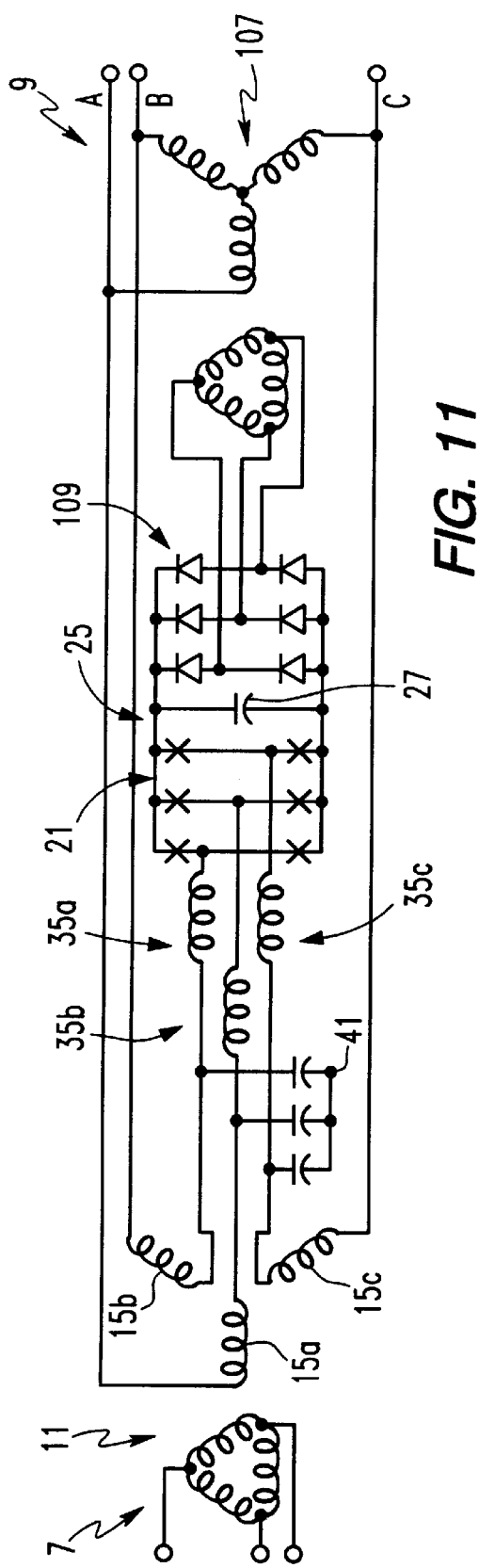
FIG. 11 is a schematic diagram of another embodiment of the invention similar to that of FIG. 4 but with a dc link which exchanges power with the electric power line.

FIG. 11 illustrates a modification of the embodiment of the invention shown in FIG. 4. In this embodiment, the dc energy device is a transformer 107 accompanied by a full wave rectifier bridge 109 which provide the dc energy required for the dc link. The transformer 107 receives power from the load side of the transmission line to maintain the voltage on the capacitor 27. The transformer 107 can be wye-delta, wye-wye, delta-delta or delta-wye wound. A fourth pole may be added to the circuit shown in FIG. 11 as in FIG. 5 if a secondary neutral is required.

Figure 12:
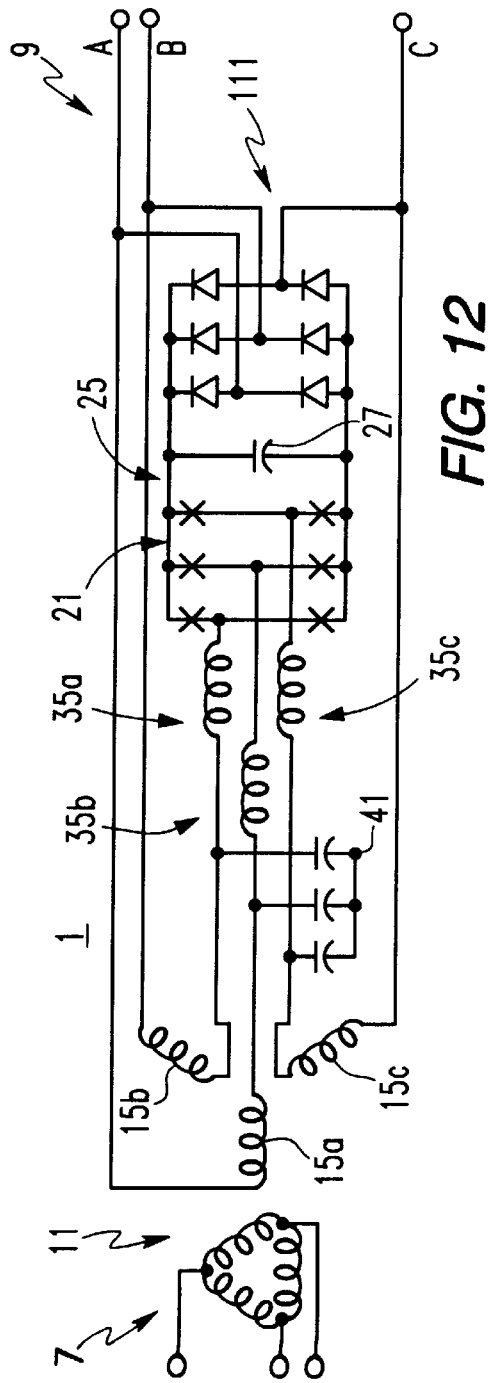
FIG. 12 is a schematic diagram of a modification of the embodiment of the invention illustrated in FIG. 11.
Figure 3:
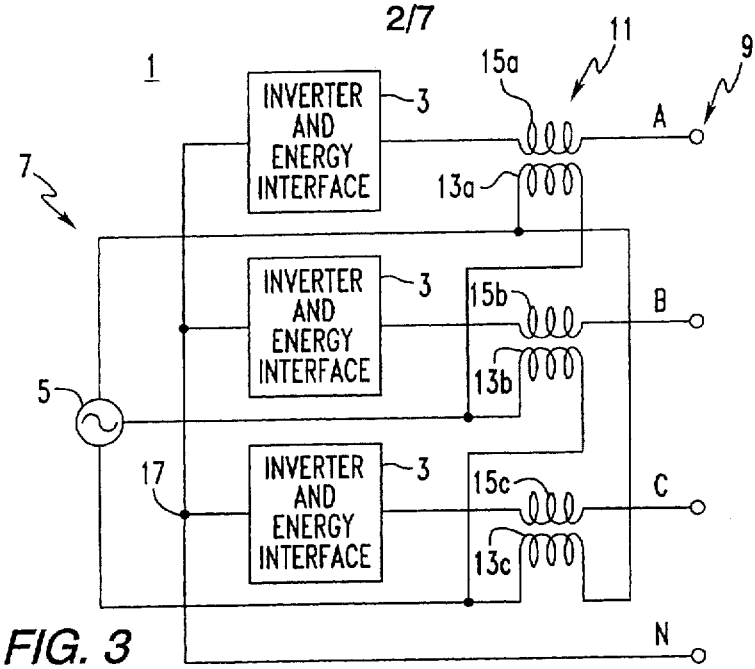
Figure 4:
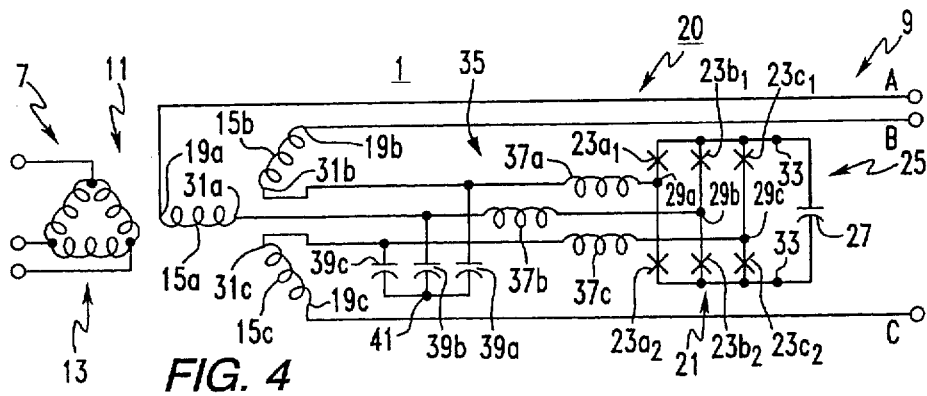
Figure 5:
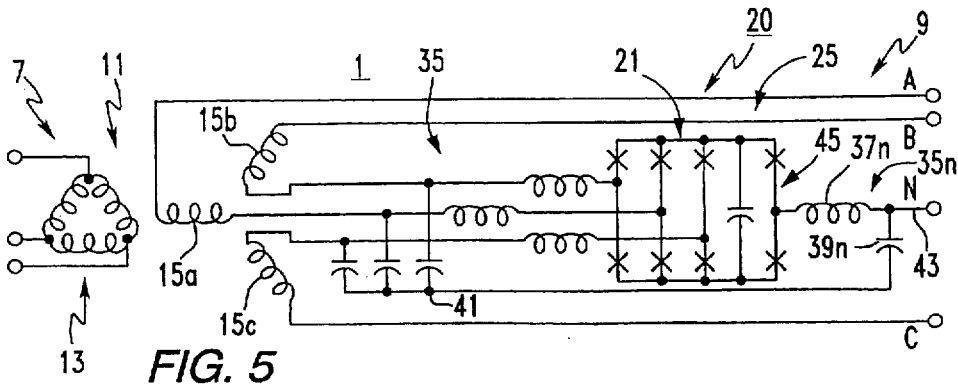

FIG. 12 illustrates another embodiment of the neutral point connected DVR in which the dc device includes a direct connection, provided by the three-phase rectifier 111, to the phase conductors of the load side 9 of the power line. This also provides for the receipt of power by the capacitor 27 and the load side 9 of the power line 1 to maintain the voltage on the capacitor. Again, a fourth pole can be added if a secondary neutral is required.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

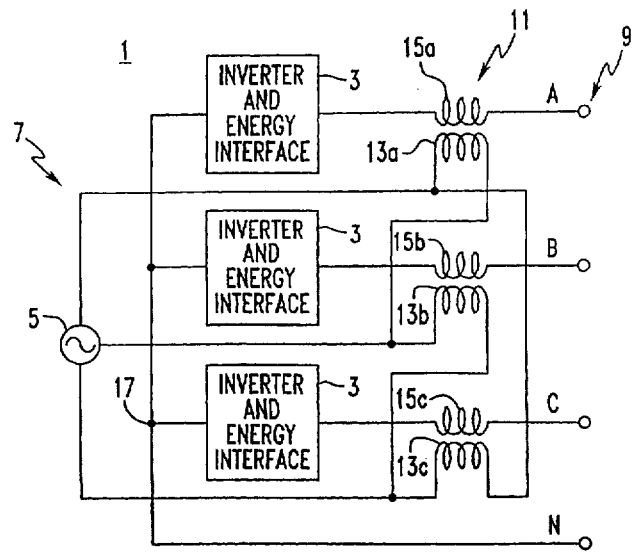

What is claimed is:

1. Apparatus for providing compensation in a three-phase electric power line between a source end and a load end, said apparatus comprising:

three-phase transformer means connected in said three-phase power line between said source end and said load end and having three primary windings connected to said source end of said three-phase electric power line and having three secondary phase windings; and inverter means wye connected in series with said three secondary phase windings of said transformer means to said load end of said electric power line.

2. The apparatus of claim 1 wherein said three secondary phase windings of said transformer means have first ends connected to a corresponding phase of said load end of said electric power line, and said inverter means comprises a three-phase inverter having ac terminals connected to second ends of corresponding ones of said secondary phase windings of said transformer means and having dc terminals and a common dc link with common dc energy means connected to said dc terminals.

3. The apparatus of claim 2 wherein said dc link includes a dc energy device which exchanges power with the electric power line.

4. The apparatus of claim 2 adapted for use with an electric power line in which said load end includes a neutral conductor, and wherein said inverter means includes a neutral inverter pole having an ac terminal connected to said neutral conductor and dc terminals connected to said common dc link.

5. The apparatus of claim 4 wherein said inverter means includes filter means.

6. The apparatus of claim 5 wherein said filter means includes inductors connected in series with said ac terminals of said inverters and shunt capacitors connected to a common node.

7. The apparatus of claim 2 wherein said inverter means includes filter means.

8. The apparatus of claim 7 wherein said filter means comprises inductors connected in series with said ac terminals of said inverter and shunt capacitors connected to a common node.

9. The apparatus of claim 1 wherein said three secondary phase windings of said transformer means have first ends connected to said load end of said electric power line and wherein said inverter means comprises three single-phase inverters each having a first ac terminal connected to a second end of a corresponding secondary phase winding of said transformer means, second ac terminals connected to the second ac terminals of the other single-phase inverters, dc terminals and dc energy means connected to said dc terminals.

10. The apparatus of claim 9 adapted for use with a power line in which said load end has a neutral conductor, and wherein said neutral conductor is connected to said second ac terminals of said three single-phase inverters.

11. The apparatus of claim 9 wherein said inverter means includes filter means.

12. The apparatus of claim 11 wherein said filter means includes inductors in series with said first and second ac terminals of said single-phase inverters and shunt connected capacitors connected to a common node.

13. The apparatus of claim 1 wherein said secondary phase windings of said transformer means have first ends connected to a corresponding phase of said load end of said electric power line and said inverter means comprises first inverter means connected to second ends of said secondary phase windings of said transformer means forming a neutral point for said wye, and second inverter means connected between said neutral point and each phase of said electric power line between said first ends of said secondary phase windings of said transformer means and said load end of said electric power line.

14. The apparatus of claim 13 wherein said first inverter means is a first three-phase inverter having ac terminals connected to the second ends of corresponding ones of said secondary phase windings of said transformer means and having a common dc link with common dc energy means, and wherein said second inverter means comprises a second three-phase inverter having ac terminals connected to corresponding phases of the load end of said electric power line and having dc terminals connected to said common dc link.

15. The apparatus of claim 13 wherein at least one of said first and second inverter means comprises a three-phase inverter with a common dc link having a common dc energy device.

16. The apparatus of claim 13 wherein said inverter means includes filter means.

17. The apparatus of claim 16 wherein said filter means comprise LC filters connected to ac terminals of said inverter means.

18. The apparatus of claim 16 adapted for use where said load end of said electric power line includes a neutral conductor and wherein means connects said neutral conductor to said neutral point of said wye.

19. The apparatus of claim 1 adapted for use with an electric power line having a neutral conductor at said load end and wherein said inverter means includes means connecting said neutral conductor to said wye.

\* \* \* \* \*

UNITED STATES PATENT AND TRADEMARK OFFICE
CERTIFICATE OF CORRECTION

PATENT NO. : 5,984,173

DATED : November 16, 1999

INVENTOR(S) : CHARLES WOOD EDWARDS

It is certified that error appears in the above-identified patent and that said Letters Patent is hereby corrected as shown below:

In the Figure appearing on the cover page, the reference characters 13a-13c and 15a-15c should be interchanged.

Figure 3:
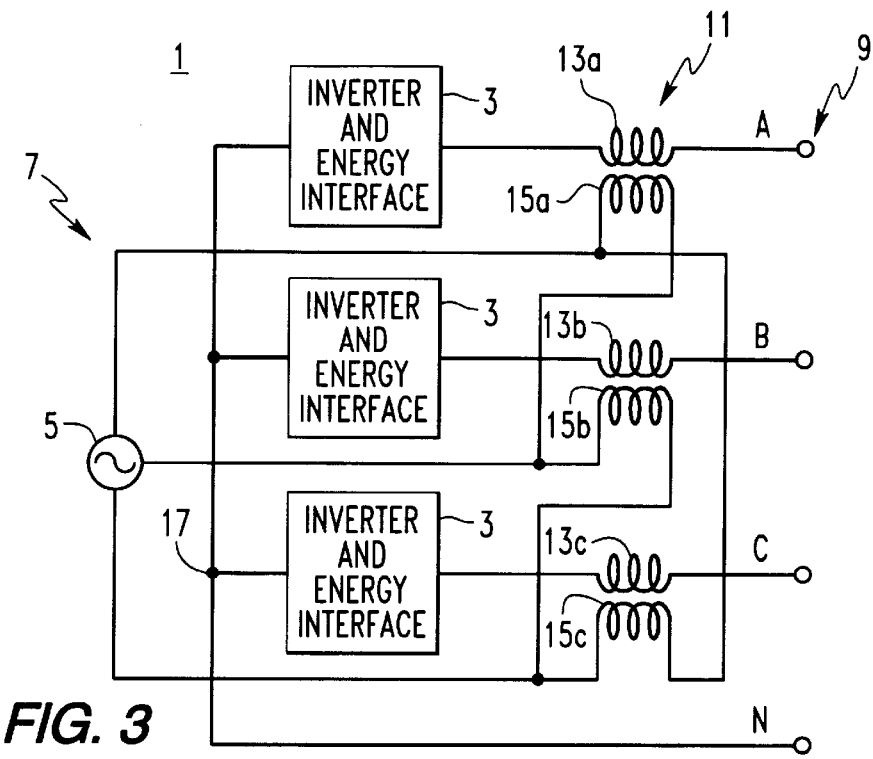
FIG. 3 is a simplified schematic circuit diagram illustrating a practical embodiment of the concept illustrated in FIG. 2.

Page 2 of the drawings which contains FIGS. 3-5 should be substituted with the attached sheet of drawings containing a corrected FIG. 3.

Signed and Sealed this

Thirteenth Day of March, 2001

*Attest:*

NICHOLAS P. GODICI

*Attesting Officer*    *Acting Director of the United States Patent and Trademark Office*

United States Patent [19]
Edwards

[11] Patent Number: 5,984,173
[45] Date of Patent: *Nov. 16, 1999

[54] NEUTRAL POINT CONNECTED APPARATUS PROVIDING COMPENSATION TO AN AC POWER LINE

[75] Inventor: Charles Wood Edwards, Monroeville, Pa.

[73] Assignee: Siemens Power Transmission & Distribution, LLC, Wendell, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/017,034

[22] Filed: Feb. 2, 1998

[51] Int. Cl.⁶ .................. G05F 1/70; H02M 1/12
[52] U.S. Cl. ............................. 232/207; 363/40
[58] Field of Search ..................... 323/207; 363/39, 363/40, 41, 43, 98, 132

[56] References Cited

U.S. PATENT DOCUMENTS

| | | | |
|---|---|---|---|
| 3,638,094 | 1/1972 | Ve Nard, II | 321/5 |
| 4,651,265 | 3/1987 | Stacey et al. | 363/35 |
| 4,674,024 | 6/1987 | Paice et al. | 363/71 |
| 4,870,557 | 9/1989 | Stacey | 363/43 |
| 4,954,726 | 9/1990 | Lipman et al. | 323/207 |
| 5,138,544 | 8/1992 | Jessee | 363/43 |
| 5,198,746 | 3/1993 | Gyugyi et al. | 323/207 |
| 5,329,222 | 7/1994 | Gyugyi et al. | 323/207 |
| 5,343,139 | 8/1994 | Gyugyi et al. | 323/207 |
| 5,347,166 | 9/1994 | Schauder | 307/113 |
| 5,469,044 | 11/1995 | Gyugyi et al. | 323/207 |
| 5,515,264 | 5/1996 | Stacey | 363/132 |
| 5,568,371 | 10/1996 | Pitel et al. | 363/39 |
| 5,751,138 | 5/1998 | Venkata et al. | 323/207 |

FOREIGN PATENT DOCUMENTS

WO 95/12963  5/1995  WIPO.

*Primary Examiner*—Adolf Denake Berhane
*Attorney, Agent, or Firm*—Eckert Seamans Cherin & Mellott, LLC

[57] ABSTRACT

Apparatus for injection voltage compensation in series into an electric power line includes an inverter or other controlled voltage source which wye connects the secondary windings of a three-phase transformer to the load end of the electric power line. The transformer, which could already be present for meeting load requirements, has its primary winding connected to the source end of the electric power line and sustains the saturation currents rather than the inverter in response to faults on the source side of the transformer. Preferably, a three-phase inverter with a common dc link is used. For active power line conditioner (APLC) action, a second, also preferably a three-phase, inverter is connected in parallel to the load end of the electric power line and to the common dc link. This parallel inverter provides harmonic and reactive power compensation and also supplies the real power requirements of the wye connection inverter.

19 Claims, 7 Drawing Sheets